United States Patent
Kikuchi et al.

(10) Patent No.: US 11,951,724 B2
(45) Date of Patent: Apr. 9, 2024

(54) FIBER-REINFORCED RESIN ARTICLE, METHOD FOR MANUFACTURING SAME, AND LAMINATE INCLUDING SAME

(71) Applicant: MITSUI CHEMICALS, INC., Tokyo (JP)

(72) Inventors: Kazuaki Kikuchi, Mobara (JP); Takeharu Isaki, Chiba (JP)

(73) Assignee: MITSUI CHEMICALS, INC., Tokyo (JP)

(*) Notice: Subject to any disclaimer, the term of this patent is extended or adjusted under 35 U.S.C. 154(b) by 163 days.

(21) Appl. No.: 17/440,016

(22) PCT Filed: Mar. 4, 2020

(86) PCT No.: PCT/JP2020/009052
§ 371 (c)(1),
(2) Date: Sep. 16, 2021

(87) PCT Pub. No.: WO2020/189268
PCT Pub. Date: Sep. 24, 2020

(65) Prior Publication Data
US 2022/0168989 A1    Jun. 2, 2022

(30) Foreign Application Priority Data
Mar. 19, 2019  (JP) ................. 2019-050909

(51) Int. Cl.
*B32B 3/14*      (2006.01)
*B32B 5/24*      (2006.01)
(Continued)

(52) U.S. Cl.
CPC ............... *B32B 3/14* (2013.01); *B32B 5/245* (2013.01); *B32B 5/26* (2013.01); *B32B 27/12* (2013.01);
(Continued)

(58) Field of Classification Search
CPC .. B32B 3/14; B32B 5/245; B32B 5/26; B32B 27/12; B32B 27/32; B32B 27/34; B32B 37/06; B32B 37/10
See application file for complete search history.

(56) References Cited

U.S. PATENT DOCUMENTS

| | | | |
|---|---|---|---|
| 2009/0117366 A1 | 5/2009 | Honma | |
| 2015/0375481 A1* | 12/2015 | Boursier | B32B 5/12 428/76 |
| 2018/0002500 A1 | 1/2018 | Nagai et al. | |

FOREIGN PATENT DOCUMENTS

| | | | |
|---|---|---|---|
| JP | 2007253573 A | * | 10/2007 |
| JP | 2008200985 A | * | 9/2008 |

(Continued)

OTHER PUBLICATIONS

Espacenet Translation of JP-2012125948-A (Year: 2023).*
(Continued)

*Primary Examiner* — Michael Zhang
(74) *Attorney, Agent, or Firm* — BUCHANAN, INGERSOLL & ROONEY PC

(57) ABSTRACT

Disclosed are: a fiber-reinforced resin article which includes, on at least one face of a unidirectional fiber-reinforced resin sheet (UDS), a plurality of chopped sheets (CS) of a unidirectional fiber-reinforced resin sheet which is the same as or different from the abovementioned unidirectional fiber-reinforced resin sheet (UDS), wherein the ratio of the chopped sheets (CS), with respect to 100 parts by mass of the unidirectional fiber-reinforced resin sheet (UDS), is at least 40 parts by mass and no more than 100 parts by mass; a method for manufacturing a fiber-reinforced resin article, said method having a step for positioning a plurality of the chopped sheets (CS), and a step for heating and pressurizing; and a laminate including the fiber-reinforced resin article and a foam layer.

14 Claims, 2 Drawing Sheets

(51) Int. Cl.
*B32B 5/26* (2006.01)
*B32B 27/12* (2006.01)
*B32B 27/32* (2006.01)
*B32B 27/34* (2006.01)
*B32B 37/06* (2006.01)
*B32B 37/10* (2006.01)

(52) U.S. Cl.
CPC .............. *B32B 27/32* (2013.01); *B32B 27/34* (2013.01); *B32B 37/06* (2013.01); *B32B 37/10* (2013.01)

(56) References Cited

FOREIGN PATENT DOCUMENTS

| | | | | |
|---|---|---|---|---|
| JP | 2009191186 A | | 8/2009 | |
| JP | 2012125948 A | * | 7/2012 | ............. B29C 65/06 |
| JP | 2012125948 A | | 7/2012 | |
| JP | 2013035246 A | | 2/2013 | |
| JP | 2013208725 A | * | 10/2013 | |
| JP | 2013208725 A | | 10/2013 | |
| JP | 2013221040 A | * | 10/2013 | |
| JP | 2018203907 A | * | 12/2018 | |
| WO | 2006028107 A1 | | 3/2006 | |
| WO | 2016114352 A1 | | 7/2016 | |

OTHER PUBLICATIONS

Espacenet Translation of JP-2018203907-A (Year: 2023).*
Espacenet Translation of JP-2013208725-A (Year: 2023).*
Espacenet Translation of JP-2013221040-A (Year: 2023).*
Espacenet Translation of JP-2008200985-A (Year: 2023).*

* cited by examiner

FIBER-REINFORCED RESIN ARTICLE, METHOD FOR MANUFACTURING SAME, AND LAMINATE INCLUDING SAME

TECHNICAL FIELD

The present invention relates to a fiber-reinforced resin article having a specific marble-effect appearance, such as a random sheet, and no defect (such as a hole) even when a thickness is relatively small, a method for manufacturing the same, and a laminate including the same. In particular, the present invention relates to a fiber-reinforced resin article very useful in applications such as electric components, PC casings, cellular phone covers, automobile components, furniture, and wall paper for construction materials.

BACKGROUND ART

In the related art, fiber-reinforced resin articles in which reinforced-fibers are combined with a matrix resin are exploited in various fields. Regarding the fiber-reinforced resin articles, for example, unidirectional fiber-reinforced resin sheets, laminates in which a plurality of unidirectional fiber-reinforced resin sheets are stacked, and random sheets are known.

PTL 1 discloses a unidirectional fiber-reinforced resin sheet by using a specific carbon fiber bundle (unidirectional material), a laminate in which a plurality of unidirectional fiber-reinforced resin sheets are stacked (unidirectional laminate), and a random sheet (random stampable sheet).

The random sheet is an in-plane isotropic sheet generally called a CTT material (chopped carbon fiber tape reinforced thermoplastics) and is a sheet that has a specific marble-effect appearance and that is readily provided with a three-dimensional shape by using a forming method such as stamp forming and press forming. The random sheet is obtained by, for example, randomly stacking and press-forming a plurality of chopped sheets which are produced by cutting a unidirectional fiber-reinforced resin sheet into chip-like shapes so as to cause integration.

PTL 2 discloses a structure that is a laminate of a random sheet formed body and a unidirectional sheet formed body, where the random sheet formed body is disposed on at least one face of the laminate. It is explained that the structure has excellent strength, strength anisotropy, formability, and forming appearance.

CITATION LIST

Non-Patent Literature

PTL 1
  WO 2016/114352
PTL 2
  Japanese Patent Application Laid-Open No. 2013-208725

SUMMARY OF INVENTION

Technical Problem

In recent years, desires for film thickness reduction and weight reduction of fiber-reinforced resin articles have increased. A random sheet is generally a sheet in which at least 8 layers of chopped sheets are stacked and integrated to realize in-plane isotropy and therefore is considerably thicker than a unidirectional fiber-reinforced resin sheet. To reduce the film thickness of the random sheet, the number of the chopped sheets stacked has to be decreased. If the number of the layers stacked is extremely decreased, holes tend to be formed at locations at which chopped sheets are unable to overlap one another and a discontinuous sheet tends to be formed.

Since the structure described in PTL 2 is a laminate in which a random sheet formed body is stacked on a unidirectional sheet formed body (unidirectional fiber-reinforced resin sheet), the above-described desires for film thickness reduction and weight reduction cannot be sufficiently satisfied. The reason for this is that the random sheet formed body used in PTL 2 is a formed body in which a plurality of layers (about 7 layers to about 9 layers in the example) of chopped prepregs (chopped sheets) are stacked and integrated and that just the formed body is considerably thick. In addition, since the thick random sheet formed body is stacked on the unidirectional sheet formed body, the total thickness of the structure is further increased.

The present invention was realized to address the above-described problems. That is, the object of the present invention is to provide a fiber-reinforced resin article having a specific marble-effect appearance such as a random sheet and no defect (such as a hole) even when a thickness is relatively small, a method for manufacturing the same, and a laminate including the same.

Solution to Problem

To address the above-described problems, the present inventors performed intensive research. As a result, it was found that integration of chopped sheets with at least one face of a unidirectional fiber-reinforced resin sheet is very useful, and the present invention was realized. That is the present invention is specified by the following.

[1] A fiber-reinforced resin article including, on at least one face of a unidirectional fiber-reinforced resin sheet (UDS), a plurality of chopped sheets (CS) of a unidirectional fiber-reinforced resin sheet that is the same as or differs from the unidirectional fiber-reinforced resin sheet (UDS), in which
the proportion of the chopped sheets (CS) relative to 100 parts by mass of the unidirectional fiber-reinforced resin sheet (UDS) is 40 parts by mass or more and 100 parts by mass or less.

[2] The fiber-reinforced resin article according to [1], in which the unidirectional fiber-reinforced resin sheet (UDS) and the chopped sheets (CS) contain a thermoplastic resin.

[3] The fiber-reinforced resin article according to [2], in which the thermoplastic resin is at least one thermoplastic resin selected from the group consisting of polypropylene-based resins and polyamide-based resins.

[4] The fiber-reinforced resin article according to [1], in which the unidirectional fiber-reinforced resin sheet (UDS) and the chopped sheets (CS) contain the same type of resin.

[5] The fiber-reinforced resin article according to [1], in which the thickness is 0.1 mm or more and 1.0 mm or less.

[6] The fiber-reinforced resin article according to [1], in which the unidirectional fiber-reinforced resin sheet (UDS) and the chopped sheets (CS) contain at least one type of fiber selected from the group consisting of carbon fiber and glass fiber.

[7] The fiber-reinforced resin article according to [1], in which a resin sheet not containing reinforcing fiber is disposed on a surface provided with the chopped sheets (CS).

[8] The fiber-reinforced resin article according to [1], in which the number of the chopped sheets (CS) per unit area is 500/m² to 7,000/m².

[9] A method for manufacturing a fiber-reinforced resin article, including:

disposing, on at least one face of a unidirectional fiber-reinforced resin sheet (UDS), a plurality of chopped sheets (CS) of a unidirectional fiber-reinforced resin sheet that is the same as or differs from the unidirectional fiber-reinforced resin sheet (UDS); and heating and pressurizing an article resulting from the disposing.

[10] A laminate comprising the fiber-reinforced resin article according to [1] and a foam layer.

[11] The laminate according to [10], in which the density of the foam layer is 0.2 to 0.7 g/cc.

[12] The laminate according to [10], in which:
the fiber-reinforced resin article is located on or above one face of the foam layer; and
the face opposite to the foam layer-side face of the fiber-reinforced resin article is provided with the plurality of chopped sheets (CS).

[13] The laminate according to [10], in which:
the fiber-reinforced resin article is located on or above one face of the foam layer;
a unidirectional fiber-reinforced resin sheet (UDS) is located on or above the other face of the foam layer; and
the face opposite to the foam layer-side face of the fiber-reinforced resin article is provided with the plurality of chopped sheets (CS).

[14] The laminate according to [10], in which:
the fiber-reinforced resin article is located on each of both faces of the foam layer; and
the face opposite to the foam layer-side face of each of the fiber-reinforced resin articles is provided with the plurality of chopped sheets (CS).

Advantageous Effects of Invention

According to the present invention, a fiber-reinforced resin article having a specific marble-effect appearance, such as a random sheet, and no defect (such as a hole) even when a thickness is relatively small, a method for manufacturing the same, and a laminate including the same can be provided.

When the fiber-reinforced resin article according to the present invention is compared with a unidirectional fiber-reinforced resin sheet, the strength (for example, tensile strength) in the direction other than the 0° direction (the direction parallel to the fiber direction of the unidirectional fiber-reinforced resin sheet) is improved.

When the fiber-reinforced resin article according to the present invention is compared with a random sheet or compared with a laminate of the random sheet and the unidirectional fiber-reinforced resin sheet, as described in PTL 2, desires for film thickness reduction and weight reduction are readily satisfied.

Light-weight and high-strength products can be provided by using the fiber-reinforced resin article for sheet insert injection molding or for a surface member in processing a foam sheet or a honeycomb plate into a laminate such as a sandwich panel.

DESCRIPTION OF EMBODIMENTS

<Fiber-Reinforced Resin Article>

Figure 1:
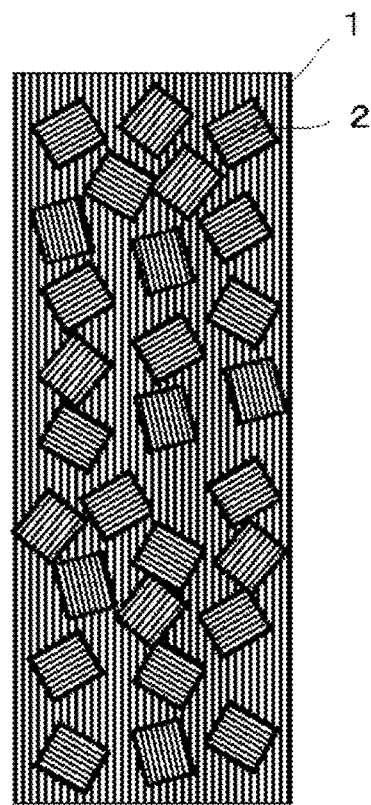
FIG. 1 is a schematic plan view illustrating an embodiment of a fiber-reinforced resin article according to the present invention.

FIG. 1 is a schematic plan view illustrating an embodiment of a fiber-reinforced resin article according to the present invention. As illustrated in FIG. 1, the fiber-reinforced resin article according to the present invention is an article in which one face (sheet face) of unidirectional fiber-reinforced resin sheet (UDS) 1 is provided with a plurality of chopped sheets (CS) 2 of a unidirectional fiber-reinforced resin sheet.

Chopped sheets (CS) 2 illustrated in FIG. 1 are small pieces of a unidirectional fiber-reinforced resin sheet and are obtained by, for example, cutting the unidirectional fiber-reinforced resin sheet into a chip-like shape. The unidirectional fiber-reinforced resin sheet serving as the raw material for chopped sheets (CS) 2 may be the same or differ from unidirectional fiber-reinforced resin sheet (UDS) 1. Specific examples of the unidirectional fiber-reinforced resin sheet serving as the raw material for unidirectional fiber-reinforced resin sheet (UDS) 1 and chopped sheets (CS) 2 will be described later.

The fiber-reinforced resin article illustrated in FIG. 1 has a surface provided with a plurality of randomly dispersed chopped sheets (CS) 2 and has a specific marble-effect appearance due to complex changes in light reflection based on randomness of the fiber orientation directions. Since chopped sheets (CS) 2 are integrated with the surface of unidirectional fiber-reinforced resin sheet (UDS) 1, holes are not formed even when chopped sheets (CS) 2 do not overlap one another. In the random sheet according to the related art, end surfaces of chopped sheets (CS) 2 tend to serve as start points of breakage. However, in the fiber-reinforced resin article according to the present invention, breakage does not readily occur since the proportion of the number of end surfaces of chopped sheets (CS) 2 is small and since unidirectional fiber-reinforced resin sheet (UDS) 1 is present. In addition, considerable curl does not readily occur since chopped sheets (CS) 2 have random fiber directions.

Unidirectional fiber-reinforced resin sheet (UDS) 1 illustrated in FIG. 1 has high strength (for example, tensile strength) in the 0° direction (the direction parallel to the fiber direction of unidirectional fiber-reinforced resin sheet (UDS)), and the strength in the direction other than the 0° direction is improved by chopped sheets (CS) 2. Therefore, the fiber-reinforced resin article does not exhibit considerable local anisotropy. Consequently, for example, even when the fiber-reinforced resin article is provided with a three-dimensional shape by using a forming method such as stamp forming or press forming, the fiber-reinforced resin article is not readily torn, and excellent shape-following ability is exhibited. Further, insert molding performed by inserting the fiber-reinforced resin article into an injection molding die or over injection molding can be readily performed.

Unidirectional fiber-reinforced resin sheet (UDS) 1 illustrated in FIG. 1 differs from the laminate having a configuration in which a random sheet obtained by forming a plurality of chopped sheets (CS) 2 into a sheet-like shape is stacked on the unidirectional fiber-reinforced resin sheet, as described in PTL 2, and can readily satisfy the desires for film thickness reduction and weight reduction because of having a configuration in which at least one face (sheet face) of unidirectional fiber-reinforced resin sheet (UDS) 1 is provided with a plurality of chopped sheets (CS) 2.

In the embodiment illustrated in FIG. 1, chopped sheets (CS) 2 are disposed without overlapping one another. Chopped sheets (CS) 2 being disposed while overlapping one another is minimized is favorable from the viewpoint of, for example, film thickness reduction of the fiber-reinforced resin article. The present invention is not limited to this. Some of the plurality of chopped sheets (CS) 2 may overlap one another. Presence or absence of overlapping one another and the number of stacking of chopped sheets (CS) 2 may be appropriately determined in accordance with, for example, the predetermined thickness of the fiber-reinforced resin article.

In the embodiment illustrated in FIG. 1, overall one face of unidirectional fiber-reinforced resin sheet (UDS) 1 is provided with chopped sheets (CS) 2, but the present invention is not limited to this. For example, both faces of unidirectional fiber-reinforced resin sheet (UDS) 1 may be provided with a plurality of chopped sheets (CS) 2, or just part of the one face or just part of both faces may be provided with a plurality of chopped sheets (CS) 2. Alternatively, at least one face of a laminate in which a plurality of unidirectional fiber-reinforced resin sheets (UDS) 1 are stacked may be provided with a plurality of chopped sheets (CS) 2.

In the embodiment illustrated in FIG. 1, the sizes of the plurality of chopped sheets (CS) 2 disposed are uniform, but the present invention is not limited to this. For example, at least two types of chopped sheets (CS) having different sizes may be used, or the sizes may have distribution. The shape of chopped sheet (CS) is not limited to being a tetragon and may be another shape.

In the embodiment illustrated in FIG. 1, nothing is stacked on the surface of the unidirectional fiber-reinforced resin sheet provided with chopped sheets (CS) 2, but the present invention is not limited to this. For example, a resin sheet not containing reinforcing fiber (protective film or the like) may be disposed on the surface of the unidirectional fiber-reinforced resin sheet provided with chopped sheets (CS) 2. The resin sheet not only protects the surface of the fiber-reinforced resin article but also, for example, enables the strength in the direction other than the 0° direction of the unidirectional fiber-reinforced resin sheet (UDS) to be further improved, warp deformation when insert molding or over injection molding is performed to be reduced, or weather resistance or flame retardancy to be provided. It is preferable that the resin sheet contain the same type of resin as a matrix resin of unidirectional fiber-reinforced resin sheet (UDS) 1 and/or a matrix resin of chopped sheets (CS) 2. Additives such as a weathering stabilizer and a flame retardant may be contained. Such a resin sheet can be formed through thermal lamination on the surface provided with chopped sheets (CS) 2 of the unidirectional fiber-reinforced resin sheet.

The proportion of the chopped sheets (CS) relative to 100 parts by mass of the unidirectional fiber-reinforced resin sheet (UDS) is 40 parts by mass or more and 100 parts by mass or less and preferably 50 parts by mass or more and 90 parts by mass or less. The amount of the chopped sheets (CS) being set to be such a specific amount or more is favorable from the viewpoint of, for example, improving the strength in the direction other than the 0° direction of the unidirectional fiber-reinforced resin sheet (UDS) and acquiring a specific marble-effect appearance. The amount being set to be such a specific amount or less is favorable from the viewpoint of, for example, reducing the film thickness and reducing the weight of the fiber-reinforced resin article, improving uniformity of the fiber-reinforced resin article thickness due to reduction in the number of places at which chopped sheets (CS) overlap one another and reduction in variations in the number of stacking at the overlapping place, and reducing the number of places that tend to become start points of breakage (end surfaces of chopped sheets (CS) and the like).

The thickness of each of the unidirectional fiber-reinforced resin sheet (UDS) and the chopped sheet (CS) is preferably 50 μm or more and 500 μm or less and more preferably 100 μm or more and 250 μm or less. The thickness being set to be such a specific thickness or more is favorable from the viewpoint of, for example, suppressing the light from passing through so as to acquire a specific marble-effect appearance. The thickness being set to be such a specific thickness or less is favorable from the viewpoint of, for example, reducing the film thickness and reducing the weight of the fiber-reinforced resin article, improving uniformity of the fiber-reinforced resin article thickness, and reducing the number of places that tend to become start points of breakage.

The thickness of the fiber-reinforced resin article is preferably 0.1 mm or more and 1.0 mm or less and more preferably 0.15 mm or more and 0.5 mm or less. The thickness of the fiber-reinforced resin article being set to be such a specific thickness or more is favorable from the viewpoint of, for example, suitability for sheet insert injection molding by using the fiber-reinforced resin article or processing into a laminate such as a sandwich panel in which the fiber-reinforced resin article is used for a surface member. The thickness of the fiber-reinforced resin article being set to be such a specific thickness or less is favorable from the viewpoint of, for example, reducing the film thickness and reducing the weight of the fiber-reinforced resin article.

The fiber volume fraction Vf of each of the unidirectional fiber-reinforced resin sheet (UDS) and the chopped sheet (CS) is preferably 0.3 or more and 0.7 or less and more preferably 0.35 or more and 0.6 or less. The specific method for calculating the volume fraction Vf is illustrated in the example described later.

There is no particular limitation regarding the size (length and width) of the unidirectional fiber-reinforced resin sheet (UDS), and the size may be appropriately determined in accordance with the use to which the fiber-reinforced resin article is applied. In general, the length (the length in the direction parallel to the fiber direction of the unidirectional fiber-reinforced resin sheet (UDS)) is preferably 10 mm or more and 2,000 mm or less, and the width (the length in the direction perpendicular to the fiber direction of the unidirectional fiber-reinforced resin sheet (UDS)) is preferably 100 mm or more and 600 mm or less.

The width of the chopped sheet (CS) (the length in the direction perpendicular to the fiber direction of the chopped sheet (CS)) is preferably 3 mm or more and 50 mm or less and more preferably 10 mm or more and 25 mm or less. The width of the chopped sheet (CS) being set to be the width within such a specific range is favorable from the viewpoint of, for example, acquiring a specific marble-effect appearance.

The length of the chopped sheet (CS) (the length in the direction parallel to the fiber direction of the chopped sheet (CS)) is preferably 10 mm or more and 50 mm or less and more preferably 10 mm or more and 25 mm or less. The length of the chopped sheet (CS) being set to be the length within such a specific range is favorable from the viewpoint of, for example, improving the strength in the direction other than the 0° direction of the unidirectional fiber-reinforced resin sheet (UDS).

The aspect ratio (length/width) of the chopped sheet (CS) is preferably 0.5 or more and 5.0 or less and more preferably 1.0 or more and 3.0 or less. In general, when the chopped sheet (CS) is press-formed, the chopped sheet (CS) does not tend to extend in the fiber direction of the chopped sheet (CS) and tends to extend in the direction perpendicular to the fiber direction. Therefore, the aspect ratio of the chopped sheet (CS) being set to be the aspect ratio within such a specific range is favorable from the viewpoint of, for example, appropriately suppressing the sheet from extending during press forming.

The number of the chopped sheets (CS) per unit area is preferably $500/m^2$ to $7,000/m^2$ and more preferably $700/m^2$ to $7,000/m^2$. The number of the chopped sheets (CS) being set to be such a specific value or more is favorable from the viewpoint of, for example, improving the strength in the direction other than the 0° direction of the unidirectional fiber-reinforced resin sheet (UDS) and acquiring a specific marble-effect appearance. The number of the chopped sheets (CS) being set to be such a specific value or less is favorable from the viewpoint of, for example, reducing the film thickness and reducing the weight of the fiber-reinforced resin article, improving uniformity of the fiber-reinforced resin article thickness due to reduction in the number of places at which chopped sheets (CS) overlap one another and reduction in variations in the number of stacking at the overlapping place, and reducing the number of places that tend to become start points of breakage (end surfaces of chopped sheets (CS) and the like). Regarding the number of sheets, "unit area" is a unit area of a face parallel to the sheet face of the unidirectional fiber-reinforced resin sheet (UDS).

It is preferable that the plurality of chopped sheets (CS) be disposed so that the fiber directions are set to be mutually random directions. With increasing randomness of disposition, a specific marble-effect appearance tends to be particularly acquired and the degree of improvement of the strength in the direction other than the 0° direction of the unidirectional fiber-reinforced resin sheet (UDS) tends to become uniform. In this regard, "be disposed so that fiber directions are mutually random directions" denotes being irregularly disposed so that fiber directions are not in accord with a specific direction.

The above-described chopped sheets (CS) with the respective sizes can be obtained by cutting the unidirectional fiber-reinforced resin sheet by using an instrument such as a utility knife, scissors, a guillotine cutter, a shear cutter, or a laser cutter.

In the present invention, there is no particular limitation regarding the types of the unidirectional fiber-reinforced resin sheet (UDS) and the chopped sheet (CS), and known unidirectional fiber-reinforced resin sheets and chopped sheets can be used.

The unidirectional fiber-reinforced resin sheet (UDS) and the chopped sheet (CS) favorably contain a thermoplastic resin from the viewpoint of ease of integrating by heat forming (press forming or the like) and more favorably contain at least one thermoplastic resin selected from the group consisting of polypropylene-based resins and polyamide-based resins.

It is preferable that the unidirectional fiber-reinforced resin sheet (UDS) and the chopped sheet (CS) contain the same type of resin from the viewpoint of safety such as difficulty in peeling after integration. This resin is a resin usually contained as a matrix resin. Therefore, for example, when the unidirectional fiber-reinforced resin sheet (UDS) contains a polypropylene-based resin as the matrix resin, it is preferable that the chopped sheet (CS) also contain a polypropylene-based resin as the matrix resin. When the unidirectional fiber-reinforced resin sheet (UDS) contains a polyamide-based resin as the matrix resin, it is preferable that the chopped sheet (CS) also contain a polyamide-based resin as the matrix resin.

The unidirectional fiber-reinforced resin sheet (UDS) and the chopped sheet (CS) preferably include at least one type of fiber selected from the group consisting of carbon fiber and glass fiber. In particular, to acquire a specific marble-effect appearance, it is more preferable that carbon fiber be contained.

<Method for Manufacturing Fiber-Reinforced Resin Article>

There is no particular limitation regarding the method for manufacturing the above-described fiber-reinforced resin article according to the present invention. The method for manufacturing the fiber-reinforced resin article according to the present invention includes a step of disposing, on at least one face of the unidirectional fiber-reinforced resin sheet (UDS), a plurality of chopped sheets (CS) of a unidirectional fiber-reinforced resin sheet that is the same as or differs from the unidirectional fiber-reinforced resin sheet (UDS) and a step of heating and pressurizing an article resulting from the disposing.

In the step of disposing the plurality of chopped sheets (CS), preferably, the chopped sheets (CS) are disposed so as not to overlap one another. However, the present invention is not limited to this. As described above, some of the plurality of chopped sheets (CS) may overlap one another. Presence or absence of overlapping one another and the number of stacking of chopped sheets (CS) may be appropriately determined in accordance with, for example, the predetermined thickness of the fiber-reinforced resin article. For example, to reduce overlapping of the chopped sheets (CS), a step of rearranging the chopped sheets (CS) may be included concurrently with or after the step of disposing the plurality of chopped sheets (CS).

In the step of disposing the plurality of chopped sheets (CS), as described above, it is preferable that the plurality of chopped sheets (CS) be disposed so that the fiber directions are set to be mutually random directions. With increasing randomness of disposition, a specific marble-effect appearance tends to be particularly acquired and the degree of improvement of the strength in the direction other than the 0° direction of the unidirectional fiber-reinforced resin sheet (UDS) tends to become uniform.

In the step of heating and pressurizing, it is preferable that the heating temperature be equal to or higher than the melting temperature of the matrix resin used for the unidirectional fiber-reinforced resin sheet (UDS) and the chopped sheet (CS). The heating temperature is usually 165° C. or higher and 250° C. or lower. The pressure is usually 0.5 MPa or more and 5.0 MPa or less.

The method for manufacturing the fiber-reinforced resin article may further include a step of providing the fiber-reinforced resin article obtained through the step of heating and pressurizing with the above-described resin sheet (for example, a thermal lamination step or a sticking step), as the situation demands.

<Fiber-Reinforced Resin Composition>

There is no particular limitation regarding the type of a fiber-reinforced resin composition constituting the unidirectional fiber-reinforced resin sheet (UDS) and the chopped sheet (CS) used in the present invention. Specific examples of the fiber-reinforced resin composition will be described below.

In general, the fiber-reinforced resin composition is a composition containing reinforcing fiber (preferably, a reinforcing fiber bundle) and a matrix resin. The reinforcing fiber bundle is obtained by, for example, treating the reinforcing fiber with a sizing agent. The reinforcing fiber bundle is aligned and is brought into contact with, for example, a molten matrix resin so as to obtain the fiber-reinforced resin composition.

Regarding the reinforcing fiber, for example, high-strength and high-modulus fiber such as carbon fiber, glass fiber, aramid fiber, alumina fiber, silicon carbide fiber, boron fiber, and metal fiber can be used. At least two types of these may be used in combination. In particular, the reinforcing fiber preferably contains at least one fiber selected from the group consisting of carbon fiber and glass fiber. There is no particular limitation regarding the average diameter of single fibers, and the average diameter is preferably 1 to 20 µm and more preferably 4 to 10 µm from the viewpoint of mechanical characteristics and surface appearance. There is no particular limitation regarding the number of single fibers of a carbon fiber bundle, and the number is preferably 100 to 100,000 and more preferably 1,000 to 50,000 from the viewpoint of productivity and characteristics.

Examples of the sizing agent used for the reinforcing fiber bundle include modified polyolefins. The modified polyolefins are preferably modified polyolefins containing at least a carboxylic acid metal salt bonded to a polymer chain. Examples of the raw material (unmodified polyolefin) for the modified polyolefin include ethylene-based polymers having a content of skeleton derived from ethylene of more than 50 mol % and propylene-based polymers having a content of skeleton derived from propylene of more than 50 mol %. Specific examples of the ethylene-based polymers include ethylene homopolymers and copolymers of ethylene and α-olefin having a carbon number of 3 to 10. Specific examples of the propylene-based polymers include propylene homopolymers and copolymers of propylene and ethylene and/or α-olefin having a carbon number of 4 to 10. More specifically, examples include homopolypropylenes, homopolyethylenes, ethylene-propylene copolymers, propylene-1-butene copolymers, and ethylene-propylene-1-butene copolymers.

The modified polyolefin is obtained by, for example, introducing a carboxylic acid group, a carboxylic anhydride group, or a carboxylic acid ester group into a polymer chain of an unmodified polyolefin through grafting and by converting the group to a state of a salt with a cation.

For example, a reinforcing fiber bundle treated with a sizing agent is obtained by dipping the reinforcing fiber into an emulsion containing the sizing agent (and additives such as an amine compound, as the situation demands) and thereafter performing drying. The content of the sizing agent in the emulsion is preferably 0.001 mass % or more and 10 mass % or less. The amount of the sizing agent attached to the reinforcing fiber bundle is preferably 0.1 mass % or more and 5.0 mass % or less.

The above-described reinforcing fiber bundle is aligned and is brought into contact with, for example, a molten matrix resin so as to obtain the fiber-reinforced resin composition. There is no particular limitation regarding the type of the matrix resin, and a thermoplastic resin is preferable. Specific examples of the thermoplastic resin include polyolefin-based resins (for example, polypropylene-based resins and polyethylene-based resins), polyamide resins, polyester resins, polycarbonate resins, polyacetal resins, polyether ketone resins, polyether ether ketone resins, and polysulfone resins. In particular, it is more preferable that the matrix resin contain at least one thermoplastic resin selected from the group consisting of polypropylene-based resins and polyamide-based resins. The matrix resin may contain a modified polyolefin.

<Laminate>

It is also preferable that the above-described fiber-reinforced resin article according to the present invention be stacked on another article so as to be used as a laminate. There is no particular limitation regarding the type of the laminate. Specifically, the laminate may be a sandwich panel in which the fiber-reinforced resin article according to the present invention is stacked on one surface or both surfaces of the above-described foam sheet or honeycomb plate or may be other types of laminates.

The laminate according to the present invention is a laminate including the fiber-reinforced resin article according to the present invention and a foam layer. In the laminate, the fiber-reinforced resin article and the foam layer may be in direct contact with each other or may be stacked one another with some other layer (intermediate layer or the like) interposed therebetween. A preferable form is a multilayer structure having places at which the fiber-reinforced resin article and the foam layer are in contact with each other. Further, it is preferable that at least one surface of the laminate be a face provided with a plurality of chopped sheets (CS) (that is, a face having a specific marble-effect appearance).

One of preferable forms of the laminate according to the present invention is a laminate in which the fiber-reinforced resin article is located on one face of the foam layer and the face opposite to the foam layer-side face of the fiber-reinforced resin article is provided with the plurality of chopped sheets (CS). This form is typically a laminate having a configuration in which the order of stacking is fiber-reinforced resin article (CS/UDS)/foam layer. In this form, the one face of the foam layer is reinforced by the fiber-reinforced resin article and the reinforced-side surface of the laminate has a marble-effect appearance.

One of preferable forms of the laminate according to the present invention is a laminate in which the fiber-reinforced resin article is located on one face of the foam layer, the unidirectional fiber-reinforced resin sheet (UDS) is located on the other face of the foam layer, and the face opposite to the foam layer-side face of the fiber-reinforced resin article is provided with the plurality of chopped sheets (CS). This form is typically a laminate having a configuration in which the order of stacking is fiber-reinforced resin article (CS/UDS)/foam layer/unidirectional fiber-reinforced resin sheet (UDS). In this form, both faces of the foam layer are reinforced by the fiber-reinforced resin article or the unidirectional fiber-reinforced resin sheet, and the surface provided with the chopped sheets (CS) of the laminate has a marble-effect appearance.

One of preferable forms of the laminate according to the present invention is a laminate in which the fiber-reinforced resin article is located on each of both faces of the foam layer, and the face opposite to the foam layer-side face of each fiber-reinforced resin article is provided with the plurality of chopped sheets (CS). This form is typically a laminate (sandwich panel) having a configuration in which the order of stacking is fiber-reinforced resin article (CS/UDS)/foam layer/fiber-reinforced resin article (UDS/CS). In this form, both faces of the foam layer are reinforced by the fiber-reinforced resin article and both reinforced surfaces of the laminate have a marble-effect appearance.

In the laminate according to the present invention, there is no particular limitation regarding the resin contained in the foam layer (hereafter referred to as "foam resin"), and various known resins can be used. The foam resin may be a crosslinked resin or a non-crosslinked resin. Specific examples of the foam resin include thermoplastic resin foams such as polyethylene-based resin foams, polypropylene-based resin foams, polystyrene-based resin foams, and polystyrene-based resin foams including a polypropylene-based resin foam as an outer layer. In particular, the foam resin is preferably composed of the same type of thermoplastic resin as the matrix resin contained in the fiber-reinforced resin article, and it is preferable that the two be propylene-based resins. According to such a configuration, the bonding strength tends to be further improved. In this regard, "the same type of thermoplastic resin" denotes each of the matrix resin and the foam layer containing, for example, a polyolefin-based resin. For example, when the matrix resin contains a polypropylene-based resin and the foam layer contains a polybutene-based resin, since the two contain the respective olefin-based resins, the matrix resin and the foam layer contain "the same type of thermoplastic resin". The same applies to, for example, polycarbonate resins, styrene-based resins, polyester resins, polyphenylene sulfide resins (PPS resins), modified polyphenylene ether resins (modified PPE resins), polyacetal resins (POM resins), liquid crystal polyesters, polyarylates, acrylic resins such as polymethyl methacrylate resins (PMMA), vinyl chloride, polyimides (PI), polyamide-imides (PAI), polyether imides (PEI), polysulfones, polyether sulfones, polyketones, polyether ketones, polyether ether ketones (PEEK), modified polyolefins, phenol resins, phenoxy resins, and polyamide resins other than polyolefin-based resins. "The two are propylene-based resins" denotes each of the matrix resin and the foam layer containing a polymer that contains 50 mass % or more of propylene as a constitutional unit.

The density of the foam layer is preferably 0.2 to 0.7 g/cc and more preferably 0.25 to 0.4 g/cc. Bubbles in the foam resin may be either independent bubbles or communicating bubbles. In general, a foam resin including independent bubbles tends to have high strength.

The expansion ratio of the foam layer is preferably 1.3 to 5 times and more preferably 2 to 4 times.

The foam layer may include a rib structure and, more specifically, may include a non-foam rib structure as part of the foam layer. The rib structure has a function of, for example, suppressing the foam from shrinking and deforming. There is no particular limitation regarding the form of the rib structure, and, for example, a grid-like form, a stripe-like form, a columnar form, and a ring-like form may be adopted. A form in which these shapes are stacked one another may be adopted. The rib structure may have a form in which a rib having a grid-like shape or the like is formed in the cross-sectional direction on the entire surface and back surface of the foam layer or may have a form in which a rib having a grid-like shape or the like is formed in the cross-sectional direction on the entire or part of one of the surface and the back surface of the foam layer. In this regard, the structure of the surface and the structure of the back surface may be connected to each other. Examples of the method for forming the non-foam rib structure as part of the foam layer include a method in which a heated knife is brought into contact with part of the foam layer so as to heat-melt a predetermined place. In addition, examples of the method include a method in which a heated rod-like metal is pushed against the foam layer so as to form a columnar shape and a method in which a heated pipe-like metal is pushed against the foam layer so as to form a ring-like shape.

The thickness of the laminate according to the present invention (thickness of the entirety including the fiber-reinforced resin article and the foam layer) is preferably 2 to 16 mm and more preferably 2 to 10 mm.

There is no particular limitation regarding the method for manufacturing the laminate according to the present invention. For example, each layer may be stacked successively and be used as the laminate without being processed, part of or the entire interface between the respective layers may be bonded by using an adhesive, or part of or the entire interface between the respective layers may be fused through pressurization and heating by using equipment such as a press machine or an iron. Alternatively, the end portion of each layer may be fixed by using an adhesive tape, or a resin pin may be used and be stuck into an appropriate portion of each layer so as to suppress the location from shifting. In particular, the method in which part of or the entire interface between the respective layers are fused through pressurization and heating is preferable.

The laminate according to the present invention may be a laminate provided with a three-dimensional shape. There is no particular limitation regarding the specific form of the three-dimensional shape, and when the surface of the laminate is provided with a shape other than a two-dimensional shape, the shape corresponds to the three-dimensional shape. Specific examples of the method for providing a three-dimensional shape include heat press methods (for example, a heat and cool method and a stamping method) and vacuum molding methods. Regarding the laminate according to the present invention, when a three-dimensional shape is provided by using a processing method such as heat press, appearance problems such as cracks do not readily occur compared with a laminate in which a foam sheet is reinforced by just a unidirectional fiber-reinforced resin sheet in the related art.

The fiber-reinforced resin article according to the present invention and the laminate including the same can be favorably used in various fields. In particular, these are very useful in applications such as electric components, PC casings, cellular phone covers, automobile components, furniture, partitions, screen walls, doors, and sliding doors, where articles are required to have a light weight and relatively high strength. Further, these are very useful in applications such as wall paper for construction materials, flooring materials, and decorating boards, where articles are required to have design flexibility.

EXAMPLES

The present invention will be described below in further detail with reference to the examples. The present invention is not limited to these. The evaluation methods used in the examples are as described below.

<Tensile Test>

Tensile Tester AG-X 100kN produced by SHIMADZU CORPORATION was used, and measurement was performed at a pulling rate of 0.45 mm/min and 23° C. The tensile test was performed under the condition in conformity with JIS K 7164 except for the thickness of a test piece so as to measure Young's modulus and tensile strength.

<Sheet Thickness>

Desimatic Standard Outside Micrometer MDE-MX produced by Mitutoyo Corporation was used, and the measurement was performed at 3 points per side of the sample, that is, at a total of 8 points (two adjacent sides share 1 point), and the average value was taken as the thickness.

<Fiber Volume Fraction Vf>

The sample sheet was cut into a square of 50 mm×50 mm, and the mass Wc (g) was measured. The cut sample was heated at 480° C. for 1 hour, a resin was removed through thermal deterioration, the mass Wf (g) of just carbon fiber was measured, and the fiber accumulation fraction Vf was determined based on the following expression.

$$\text{fiber volume fraction } Vf = (Wf/Wc) \times \rho c/\rho f$$

Herein, $\rho c$ represents the density (g/cm$^3$) of the sample, and $\rho f$ represents the density (g/cm$^3$) of the carbon fiber used for the sample.

Example 1

(Production Of Unidirectional Fiber-Reinforced Resin Sheet (UDS))

A unidirectional fiber-reinforced resin sheet (thickness of 162.4 μm and fiber volume fraction Vf of 0.53) was produced by using the method described in example 6 of WO 2016/114352 and was cut so as to obtain a unidirectional fiber-reinforced resin sheet (UDS) of 200 mm×200 mm. The mass of the resulting unidirectional fiber-reinforced resin sheet (UDS) was 8.98 g.

(Production of Chopped Sheet (CS))

A unidirectional fiber-reinforced resin sheet (UDS) akin to the unidirectional fiber-reinforced resin sheet (UDS) produced as described above was slitted into a tape-like shape with a width of 12.5 mm, and this was further cut into a length of about 15 mm so as to obtain a plurality of chopped sheets (CS).

(Production of Fiber-Reinforced Resin Article)

On a unidirectional fiber-reinforced resin sheet (UDS), 4.49 g of a plurality of chopped sheets (CS) produced as described above were randomly disposed so as to minimize overlapping one another (the proportion of chopped sheets (CS) relative to 100 parts by mass of unidirectional fiber-reinforced resin sheet (UDS)=50 parts by mass and the number of chopped sheets (CS) per unit area=about 3,200/m$^2$). Subsequently, the resulting article in which the plurality of chopped sheets (CS) were disposed on the unidirectional fiber-reinforced resin sheet (UDS) was interposed between two stainless steel sheets, and a pressure of 2 MPa was applied for 3 minutes by using a press apparatus (MINI TEST PRESS MP-WCH produced by Toyo Seiki Seisaku-sho, Ltd.) heated to 185° C. Thereafter, the article was transferred to a press apparatus adjusted to 15° C. and cooled while a pressure of 2 MPa was applied for 30 seconds and a pressure of 4 MPa was further applied for 30 seconds. As a result of such press forming, a smooth fiber-reinforced resin article having a thickness of 255 μm was obtained. The total mass of the fiber-reinforced resin article was 13.47 g, and the ratio of the total mass of the fiber-reinforced resin article to the mass of the unidirectional fiber-reinforced resin sheet (UDS) (hereafter referred to as "mass ratio") was 1.5.

Figure 2:
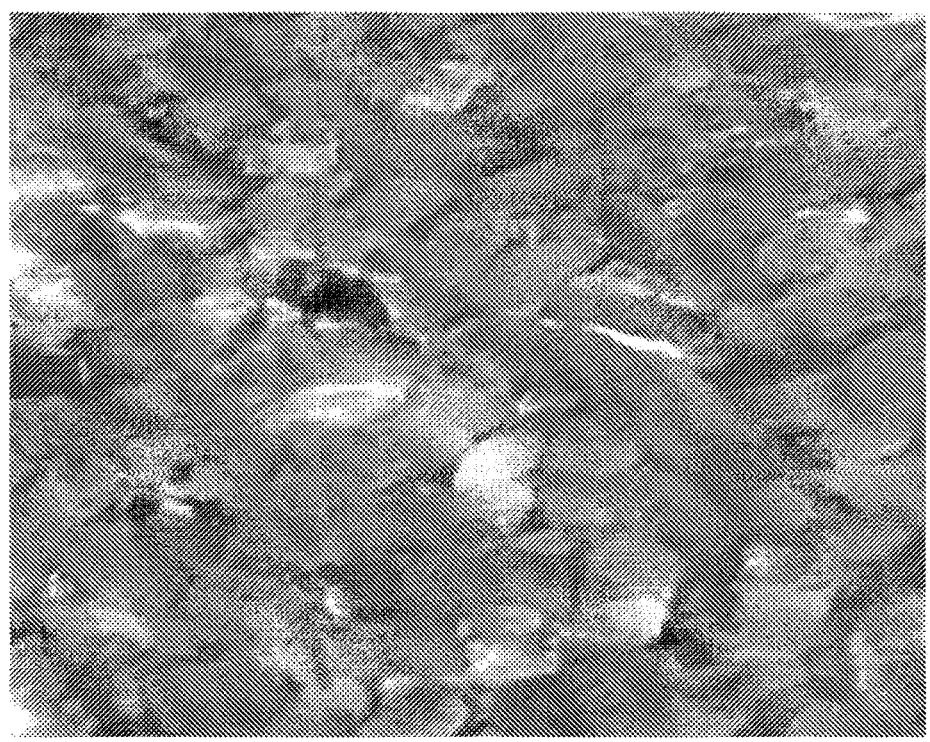
FIG. 2 is an image of part of an appearance of a fiber-reinforced resin article obtained in example 1 imaged in an oblique direction.

The resulting fiber-reinforced resin article was subjected to tensile tests in the 0° direction, the 45° direction, and the 90° direction so as to measure Young's modulus and the tensile strength. Herein, the 0° direction is a direction parallel to the fiber direction of the unidirectional fiber-reinforced resin sheet (UDS), the 45° direction is a direction at 45° relative to the fiber direction, and the 90° direction is a direction at a right angle relative to the fiber direction. The size of each test piece was set to be 25 mm×150 mm. As a result, Young's modulus in the 0° direction of the fiber-reinforced resin article was 61.53 GPa, the tensile strength was 587 MPa, Young's modulus in the 45° direction was 5.44 GPa, the tensile strength was 10.9 MPa, Young's modulus in the 90° direction was 4.05 GPa, and the tensile strength was 9.0 MPa. The chopped sheet (CS)-side appearance of the fiber-reinforced resin article exhibited a marble effect. FIG. 2 is an image of part of the appearance of the fiber-reinforced resin article imaged in an oblique direction.

Example 2

A smooth fiber-reinforced resin article was produced in the same manner as in example 1 except that the mass of the chopped sheets (CS) disposed on the unidirectional fiber-reinforced resin sheet (UDS) was changed to 5.39 g, and a tensile test was performed (the proportion of chopped sheets (CS) relative to 100 parts by mass of unidirectional fiber-reinforced resin sheet (UDS)=60 parts by mass and the number of chopped sheets (CS) per unit area=about 3,840/m$^2$). The thickness of the fiber-reinforced resin article was 251 μm, the total mass was 14.37 g, and the mass ratio was 1.6. Young's modulus in the 0° direction of the fiber-reinforced resin article was 69.64 GPa, the tensile strength was 609 MPa, Young's modulus in the 45° direction was 6.53 GPa, the tensile strength was 13.1 MPa, Young's modulus in the 90° direction was 5.42 GPa, and the tensile strength was 7.9 MPa. The chopped sheet (CS)-side appearance of the fiber-reinforced resin article exhibited a marble effect.

Example 3

A smooth fiber-reinforced resin article was produced in the same manner as in example 1 except that the mass of the chopped sheets (CS) disposed on the unidirectional fiber-reinforced resin sheet (UDS) was changed to 8.08 g, and a tensile test was performed (the proportion of chopped sheets (CS) relative to 100 parts by mass of unidirectional fiber-reinforced resin sheet (UDS)=90 parts by mass and the number of chopped sheets (CS) per unit area=about 5,760/m$^2$). The thickness of the fiber-reinforced resin article was 313 μm, the total mass was 17.06 g, and the mass ratio was 1.9. Young's modulus in the 0° direction of the fiber-reinforced resin article was 64.94 GPa, the tensile strength was 588 MPa, Young's modulus in the 45° direction was 22.7 GPa, the tensile strength was 24.3 MPa, Young's modulus in the 90° direction was 4.72 GPa, and the tensile strength was 11.3 MPa. The chopped sheet (CS)-side appearance of the fiber-reinforced resin article exhibited a marble effect.

Comparative Example 1

A smooth fiber-reinforced resin article having a thickness of 323 μm was obtained by stacking two unidirectional fiber-reinforced resin sheets (UDS) akin to that produced in example 1 in the 0° direction and performing press forming under the same condition as in example 1. The total mass of the fiber-reinforced resin article was 17.96 g, and the mass ratio was 2.0. In this regard, the mass ratio in comparative example 1 was a ratio of the total mass of the fiber-reinforced resin article to the mass of the unidirectional fiber-reinforced resin sheet (UDS) serving as a substrate. The tensile test akin to that in example 1 was performed. As a result, Young's modulus in the 0° direction was 105.42 GPa, the tensile strength was 1,499 MPa, Young's modulus in the 45° direction was 5.03 GPa, the tensile strength was 9.3 MPa, Young's modulus in the 90° direction was 3.43 GPa, and the tensile strength was 5.6 MPa, and the strength in the 45° direction and the strength in the 90° direction were low compared with the fiber-reinforced resin article of example 1. Regarding such a unidirectional fiber-reinforced resin sheet (UDS) of comparative example 1, when a three-dimensional shape is provided by press forming, there is a high possibility that cracking occurs.

Comparative Example 2

A fiber-reinforced resin article having a thickness of 314 μm was obtained by stacking a unidirectional fiber-reinforced resin sheet (UDS) akin to that produced in example 1 in the 0° direction, stacking another sheet in the 90° direction, and performing press forming under the same condition as in example 1. The total mass of the fiber-reinforced resin article was 17.96 g, and the mass ratio was 2.0. In this regard, the mass ratio in comparative example 2 was a ratio of the total mass of the fiber-reinforced resin article to the mass of the unidirectional fiber-reinforced resin sheet (UDS) serving as a substrate. The resulting fiber-reinforced resin article was considerably curled due to a difference in the shrinkage between in the 0° direction and in the 90° direction. The tensile test akin to that in example 1 was performed. As a result, Young's modulus in the 0° direction (the direction parallel to the fiber direction of the lower unidirectional fiber-reinforced resin sheet (UDS)) was 57.84 GPa, the tensile strength was 699 MPa, Young's modulus in the 45° direction was 4.92 GPa, the tensile strength was 36.5 MPa, Young's modulus in the 90° direction (the direction perpendicular to the fiber direction of the lower unidirectional fiber-reinforced resin sheet (UDS)) was 50.0 GPa, and the tensile strength was 604 MPa. Regarding such a bidirectional (the 0° direction and the 90° direction) fiber-reinforced resin sheet (UDS) of comparative example 2, the shape-following ability is poor, and when a three-dimensional shape is provided by press forming, there is a high possibility that cracking or wrinkling occurs.

Comparative Example 3

Figure 3:
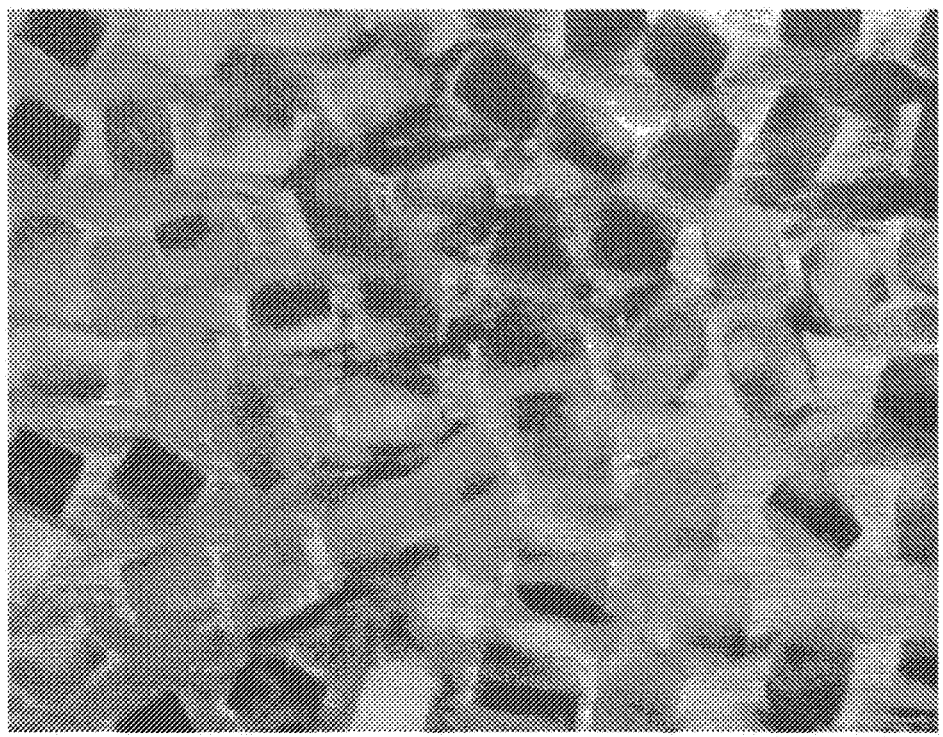
FIG. 3 is an image of part of an appearance of a fiber-reinforced resin article obtained in comparative example 3 imaged in an oblique direction.

A fiber-reinforced resin article was produced in the same manner as in example 1 except that the mass of the chopped sheets (CS) disposed on the unidirectional fiber-reinforced resin sheet (UDS) was changed to 2.70 g, and a tensile test was performed (the proportion of chopped sheets (CS) relative to 100 parts by mass of unidirectional fiber-reinforced resin sheet (UDS)=30 parts by mass and the number of chopped sheets (CS) per unit area=about 1,920/m2). The thickness of the fiber-reinforced resin article was 210 μm, the total mass was 11.67 g, and the mass ratio was 1.3. Young's modulus in the 0° direction of the fiber-reinforced resin article was 58.50 GPa, the tensile strength was 516 MPa, Young's modulus in the 45° direction was 4.70 GPa, the tensile strength was 8.2 MPa, Young's modulus in the 90° direction was 2.78 GPa, and the tensile strength was 4.5 MPa and these were inferior compared with the examples. The chopped sheet (CS)-side appearance of the fiber-reinforced resin article exhibited many gaps and a patchy state, and it could not be said that a marble effect was exhibited. FIG. 3 is an image of part of the appearance imaged in an oblique direction.

Comparative Example 4

Figure 4:
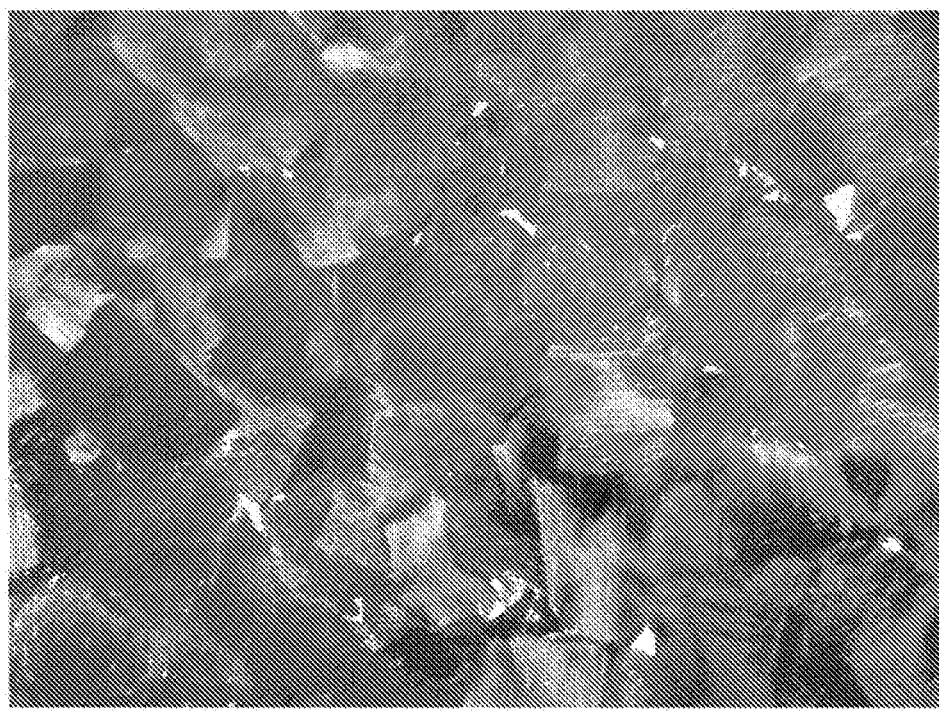
FIG. 4 is an image of part of an appearance of a fiber-reinforced resin article obtained in comparative example 4 imaged in an oblique direction.

A fiber-reinforced resin article (random sheet) having a thickness of 321 μm was obtained by randomly disposing 17.96 g of a plurality of chopped sheets (CS) akin to those produced in example 1, in a size of 200 mm×200 mm, on a stainless steel sheet so as to minimize overlapping of more than two layers and by performing press forming under the same condition as in example 1. Consequently, holes were formed in places of the fiber-reinforced resin article and a uniform sheet was not obtained. FIG. 4 is an image of part of the appearance imaged in an oblique direction.

The results of examples 1 to 3 and comparative examples 1 to 4 above are collectively described in Table 1.

TABLE 1

| | | Example 1 | Example 2 | Example 3 | Comparative example 1 | Comparative example 2 | Comparative example 3 | Comparative example 4 |
|---|---|---|---|---|---|---|---|---|
| Total mass (g) | | 13.47 | 14.37 | 17.06 | 17.96 | 17.96 | 11.67 | 17.96 |
| Mass ratio | | 1.5 | 1.6 | 1.9 | 2.0 | 2.0 | 1.3 | — |
| Thickness (μm) | | 251 | 255 | 313 | 323 | 314 | 210 | 321 |
| 0° direction | Young's modulus (GPa) | 61.53 | 69.64 | 64.94 | 105.42 | 57.84 | 58.50 | — |
| | Tensile strength (MPa) | 587 | 609 | 588 | 1499 | 699 | 516 | — |
| 45° direction | Young's modulus (GPa) | 5.44 | 6.53 | 22.7 | 5.03 | 4.92 | 4.70 | — |
| | Tensile strength (MPa) | 10.9 | 13.1 | 24.3 | 9.3 | 36.5 | 8.2 | — |
| 90° direction | Young's modulus (GPa) | 4.05 | 5.42 | 4.72 | 3.43 | 50.0 | 2.78 | — |
| | Tensile | 9.0 | 7.9 | 11.3 | 5.6 | 604 | 4.5 | — |

TABLE 1-continued

| | Example 1 | Example 2 | Example 3 | Comparative example 1 | Comparative example 2 | Comparative example 3 | Comparative example 4 |
|---|---|---|---|---|---|---|---|
| strength (MPa) | | | | | | | |

Example 4

(Production of Fiber-Reinforced Resin Article)

Two fiber-reinforced resin articles having a thickness of 255 μm equal to that in example 1 were produced.

(Production of Laminate)

A polypropylene foam sheet (PAULOWNIA produced by Mitsui Chemicals Tohcello, Inc., density=0.3 g/cc, expansion ratio=3 times) having a thickness of 5 mm was cut into a form of 200 mm×200 mm. Subsequently, stacking was performed in the order of fiber-reinforced resin article/foam sheet/fiber-reinforced resin article. In the stacking step, the face (inner face) of each fiber-reinforced resin article in contact with the foam sheet was set to be the face of the unidirectional fiber-reinforced resin sheet (UDS), and a face (outer face) opposite to the above-described face was set to be the face provided with the chopped sheets (CS). The respective fiber directions of the unidirectional fiber-reinforced resin sheets (UDS) of each fiber-reinforced resin article were set to be the same direction (0° direction).

A mold release film was disposed on the outer face of each fiber-reinforced resin article, the resulting article was placed into a press apparatus (apparatus name: MINI TEST PRESS MP-WCL produced by Toyo Seiki Seisaku-sho, Ltd.) heated to 200° C. and was pressurized at a pressure of 0.8 MPa for 1 minute. Subsequently, the resulting article was transferred to a press apparatus (apparatus name: MINI TEST PRESS MP-WC produced by Toyo Seiki Seisaku-sho, Ltd.) cooled by cooling water at 40° C. and was cooled at a pressure of 0.2 MPa for 10 minutes. Thereafter, the resulting article was removed, and the mold release film was peeled so as to obtain a laminate (sandwich panel) having a multilayer configuration of fiber-reinforced resin article (CS/UDS)/foam layer/fiber-reinforced resin article (UDS/CS) and a thickness of 5 mm. Both the outer faces of the laminate were faces provided with the chopped sheets (CS) of the fiber-reinforced resin article, and had a marble effect appearance.

INDUSTRIAL APPLICABILITY

The fiber-reinforced resin article according to the present invention can be favorably used in various fields. In particular, these are very useful in applications such as electric components, PC casings, cellular phone covers, automobile components, furniture, partitions, screen walls, doors, and sliding doors, where articles are required to have a light weight and relatively high strength. Further, these are very useful in applications such as wall paper for construction materials, flooring materials, and decorating boards, where articles are required to have design flexibility.

REFERENCE SIGNS LIST

1 Unidirectional fiber-reinforced resin sheet (UDS)
2 Chopped sheet (CS)

The invention claimed is:

1. A fiber-reinforced resin article comprising:
a unidirectional fiber-reinforced resin sheet (UDS) and a plurality of chopped sheets (CS) located on at least one face of the unidirectional fiber-reinforced resin sheet (UDS), wherein
the chopped sheets (CS) are small pieces of a unidirectional fiber-reinforced resin sheet that is the same as or differs from the unidirectional fiber-reinforced resin sheet (UDS),
the proportion of the chopped sheets (CS) relative to 100 parts by mass of the unidirectional fiber-reinforced resin sheet (UDS) is 40 parts by mass or more and 100 parts by mass or less, and
the chopped sheets (CS) comprise a chopped sheet that is disposed so as not to overlap any other chopped sheets.

2. The fiber-reinforced resin article according to claim 1, wherein both of the unidirectional fiber-reinforced resin sheet (UDS) and the chopped sheets (CS) contain a thermoplastic resin.

3. The fiber-reinforced resin article according to claim 2, wherein both of the thermoplastic resin is at least one thermoplastic resin selected from the group consisting of polypropylene-based resins and polyamide-based resins.

4. The fiber-reinforced resin article according to claim 1, wherein the unidirectional fiber-reinforced resin sheet (UDS) and the chopped sheets (CS) contain the same type of resin.

5. The fiber-reinforced resin article according to claim 1, wherein the thickness of the fiber-reinforced resin article is 0.1 mm or more and 1.0 mm or less.

6. The fiber-reinforced resin article according to claim 1, wherein both of the unidirectional fiber-reinforced resin sheet (UDS) and the chopped sheets (CS) contain at least one type of fiber selected from the group consisting of carbon fiber and glass fiber.

7. The fiber-reinforced resin article according to claim 1, wherein a resin sheet not containing reinforcing fiber is disposed on a surface of the fiber-reinforced resin article on which the chopped sheets (CS) is located.

8. The fiber-reinforced resin article according to claim 1, wherein the number of the chopped sheets (CS) per unit area is 500/m² to 7,000/m².

9. A laminate comprising the fiber-reinforced resin article according to claim 1 and a foam layer.

10. The laminate according to claim 9, wherein the density of the foam layer is 0.2 to 0.7 g/cc.

11. The laminate according to claim 9, wherein:
the fiber-reinforced resin article is located on or above one face of the foam layer; and
the face opposite to the foam layer-side face of the fiber-reinforced resin article is provided with the plurality of chopped sheets (CS).

12. The laminate according to claim 9, wherein:
the fiber-reinforced resin article is located on or above one face of the foam layer;
the unidirectional fiber-reinforced resin sheet (UDS) is located on or above the other face of the foam layer; and
the face opposite to the foam layer-side face of the fiber-reinforced resin article is provided with the plurality of chopped sheets (CS).

13. The laminate according to claim 9, wherein:
the fiber-reinforced resin article is located on each of both faces of the foam layer; and
the face opposite to the foam layer-side face of each of the fiber-reinforced resin articles is provided with the plurality of chopped sheets (CS).

14. A method for manufacturing a fiber-reinforced resin article, comprising:
disposing, on at least one face of a unidirectional fiber-reinforced resin sheet (UDS), a plurality of chopped sheets (CS) which is small pieces of a unidirectional fiber-reinforced resin sheet that is the same as or differs from the unidirectional fiber-reinforced resin sheet (UDS), wherein the chopped sheets (CS) are disposed such that the chopped sheets (CS) comprise a chopped sheet that does not overlap any other chopped sheets; wherein the proportion of the chopped sheets (CS) relative to 100 parts by mass of the unidirectional fiber-reinforced resin sheet (UDS) is 40 parts by mass or more and 100 parts by mass or less; and
heating and pressurizing an article resulting from the disposing.

\* \* \* \* \*